United States Patent [19]
Rodriguez

[11] 4,182,331
[45] Jan. 8, 1980

[54] ANIMAL SUPPOSITORY HOLDER

[76] Inventor: Rene Rodriguez, 8 Greenway North, Forest Hills, N.Y. 11376

[21] Appl. No.: 892,111

[22] Filed: Mar. 31, 1978

[51] Int. Cl.² .................. A01K 23/00; A61F 15/00
[52] U.S. Cl. ...................................... 128/271; 119/95; 128/283
[58] Field of Search ............... 128/271, 283, 286–287, 128/295; 119/95, 143

[56] References Cited

U.S. PATENT DOCUMENTS

| | | | |
|---|---|---|---|
| 2,491,799 | 12/1949 | Clarke | 128/283 |
| 3,156,240 | 11/1964 | Harrison et al. | 128/271 |
| 3,421,506 | 1/1969 | Webb | 128/283 |
| 3,786,787 | 1/1974 | Weinberger | 128/283 |
| 3,792,687 | 2/1974 | Ehrman | 128/283 |

FOREIGN PATENT DOCUMENTS 1018586 10/1957 Fed. Rep. of Germany .......... 128/271

*Primary Examiner*—Robert W. Michell
*Assistant Examiner*—C. F. Rosenbaum
*Attorney, Agent, or Firm*—Kane, Dalsimer, Kane, Sullivan and Kurucz

[57] ABSTRACT

A holder for facilitating the hygienic insertion of a suppository within the rectum of an animal. The holder includes a relatively large receptacle attached to a harness which secures it to the animal. A smaller enclosure for housing a suppository is positioned within the large receptacle. Due to the construction of the holder, a suppository may be administered without directly contacting either the animal or the suppository. The receptacle is detachable from the harness, and may also serve as an excrement collector.

8 Claims, 3 Drawing Figures

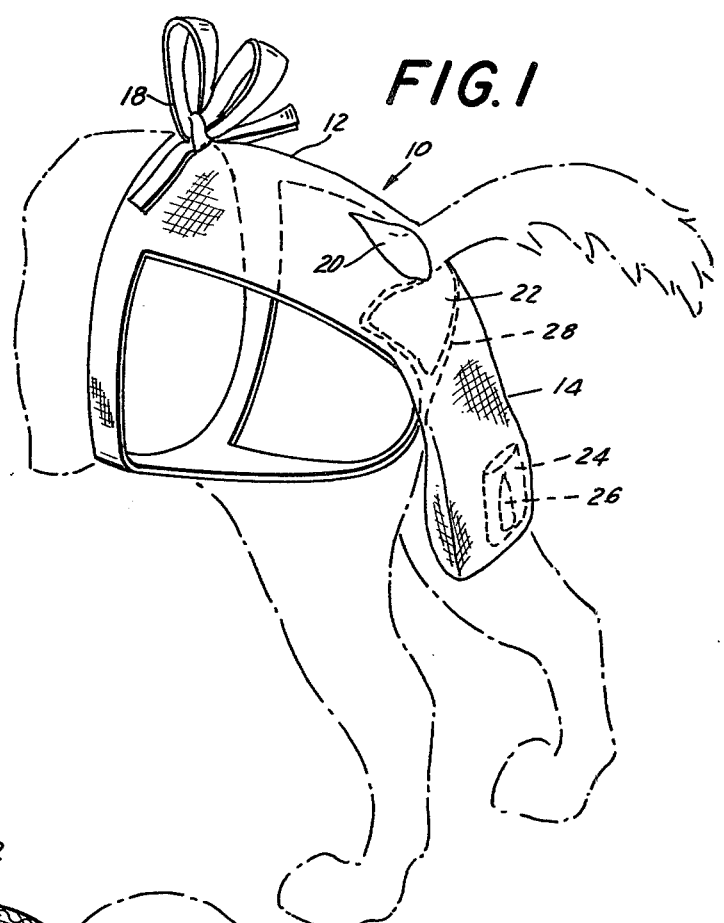
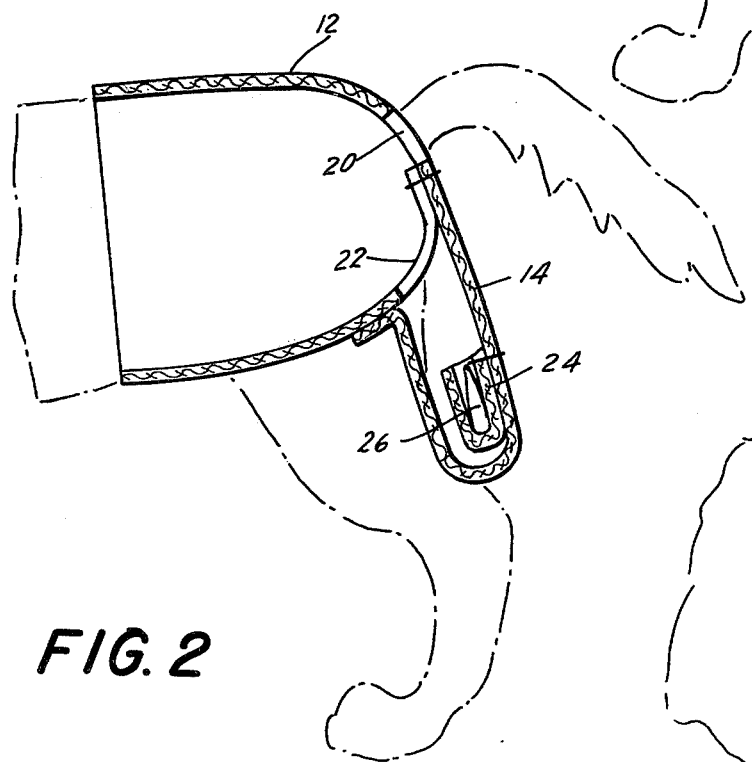
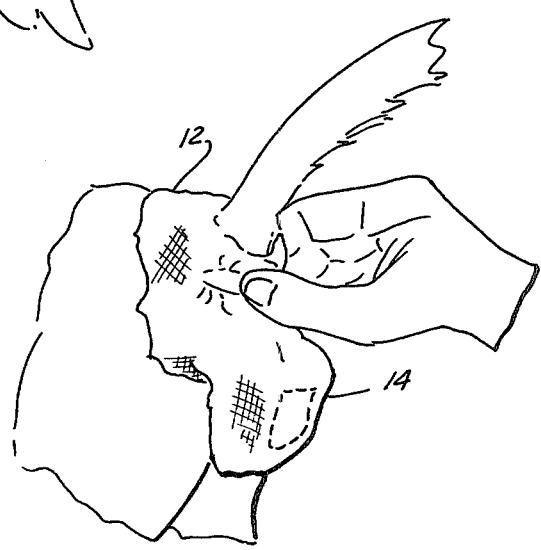
FIG. 1
FIG. 2
FIG. 3

ANIMAL SUPPOSITORY HOLDER

BACKGROUND OF THE INVENTION

The field of the invention concerns suppository holders for removable attachment to the posteriors of animals.

The administration of medicines or laxatives to an animal via a suppository has commonly been accomplished by utilizing rubber gloves or the like to prevent contact with the rectal area of the animal. If the suppository is improperly inserted or otherwise expelled by the animal, it will fall to the floor possibly contaminating both the suppository and the floor. Furthermore, the exterior surfaces of the gloves will be contaminated and must be discarded properly.

Although harnesses having removable receptacles for containment of excrement are known to the art (e.g., U.S. Pat. Nos. 3,817,217; 3,875,903), none are adapted for retention or insertion of a suppository.

SUMMARY OF THE INVENTION

It is an object of the invention to provide a device which facilitates the sanitary insertion of a suppository within the anus of an animal.

It is an object of the invention to provide a device which may be discarded in a manner which minimizes contamination of the outside environment.

Still another object of the invention is to provide a device which is easily and economically manufactured.

With these objects and others in mind, a harness is provided having a detachable receptacle in which a suppository is enclosed. A smaller enclosure, attached to and enclosed within the receptacle, may be utilized for retaining the suppository. This enables a veterinarian or other user to easily locate the suppository.

The harness is secured such that the larger of the receptacles covers the anal portion of the animal. The receptacle should be flexible to allow the user to locate the suppository with his fingers and manipulate it into the rectum of the animal. If the suppository is dislodged or expelled for some reason, it will fall into the receptacle rather than on the floor. Since it has not been contaminated by the floor, the same suppository may be manipulated through the receptacle and into the rectum of the animal again.

After the suppository has permanently been inserted, the receptacle may be detached from the harnesss and discarded. Alternatively, it may be employed as an excrement collector, particularly if a laxative has been administered to the animal. A major advantage of a receptacle of the type described herein is that it is contaminated on its interior surface. Removal and disposal are more easily accomplished as there is no surface which should contact the hand or surrounding environment in an unsanitary manner.

BRIEF DESCRIPTION OF THE DRAWINGS

FIG. 1 is a perspective view showing the posterior of a dog with a harness and suppository attached thereto;

FIG. 2 is a sectional view showing the harness, receptacle, and pouch with a suppository enclosed therein;

FIG. 3 illustrates the administration of a suppository within the rectum of the animal.

DESCRIPTION OF THE INVENTION

FIG. 1 illustrates the invention as positioned on the haunches of a dog. The holder 10 includes a harness 12 and a receptacle 14 detachably secured to the harness. The harness shown in this embodiment is intended to be reusable, and is accordingly constructed of a material which is durable yet comfortable for the animal. Leather and a number of known synthetic or polymeric substances are examples of possible materials for the harness. The receptacle 14 is intended to be disposable, and may be of non-transparent plastic. The plastic utilized for the receptacle 14 is preferably flexible.

The harness shown in FIGS. 1-2 includes belt or girth portions 16 and tie straps 18. These straps allow the harness to be comfortably fitted on animals of varying size. An opening 20 is provided for the animal's tail, and a second opening 22 for the anus.

The mouth 28 of the receptacle adjoins the opening 22, and is detachably secured thereon. Adhesives, snaps, buttons, and other fastening means could be employed for this purpose. A small pouch or enclosure 24 may be attached to the interior of the receptacle. The pouch holds a suppository 26 in a position where it may easily be located by a veternarian or other user.

In use, a suppository 26 is inserted within pouch 24 and the receptacle 14 is attached to the harness 12. The holder 10 is then secured to the animal as shown in FIG. 1. The user easily locates the suppository 26, pinches the walls of the receptacle, and urges it up through the pouch between his thumb and index finger. (See FIG. 3). He then inserts it within the animal's anus.

If the suppository is either dropped or expelled by the animal, it will fall into the receptacle rather than on the floor. It can be reinserted rather than discarded, and there is no mess on the floor to clean up. Once the suppository is finally inserted, the receptacle can be removed. It is also possible to employ the receptacle as an excrement collector.

The receptacle is then detached from the harness and discarded. Since only its interior surface will be contaminated, there is no possibility of contaminating either the user's hands or the external environment as gloves may do. The mouth of the receptacle can be tied closed and disposed of in a hygienic manner.

It can be seen that an advantageous method and apparatus for the administration of suppositories is provided by the invention. Although the embodiment described herein provides particular features which facilitate effective and hygienic usage, it should not be interpretted as limiting the invention in any manner. The scope of the invention should accordingly be determined by the appended claims.

What is claimed is:

1. A holder designed for facilitating the hygienic insertion of a suppository within the rectum of an animal, comprising:
  a receptacle having flexible walls and an opening for communication with the rectum of an animal;
  an enclosure positioned within said receptacle for retention of a suppository, said enclosure being smaller than said receptacle to facilitate location of a suppository, and attached to a wall thereof; and
  a harness for securing the receptacle on the animal, said harness including means for securing the receptacle thereto.

2. A holder as described in claim 1 wherein the receptacle is of plastic material.

3. A holder as described in claim 1 wherein the harness includes means for adapting said harness for animals of various sizes.

4. A holder as described in claim 3 in which said means for adapting said harness for animals of various sizes includes a girth and tie straps for said girth.

5. A holder as described in claim 1 wherein the receptacle is detachably secured to the harness.

6. A method for administering a suppository to an animal, comprising the steps of:
provaluating a receptacle having flexible walls, and opening, an enclosure within said receptacle and attached to a wall thereof, said enclosure being smaller than said receptacle, to facilitate locating a suppository therein and a suppository located within said enclosure,
positioning the opening of said receptacle adjacent to the anus of an animal, said opening establishing communication between the interior of the receptacle and the anus; and
pinching the walls of the receptacle such that said suppository moves from said enclosure, through the opening, and into the anus of the animal.

7. A method as described in claim 6 which includes positioning the receptacle such that the suppository will fall into said receptacle if expelled by the animal.

8. A method as described in claim 6 which includes providing a harness attached to said animal having means for detachably securing the receptacle such that the opening of said receptacle is adjacent to the anus of the animal.

* * * * *